(12) United States Patent
Nammi et al.

(10) Patent No.: US 9,813,209 B2
(45) Date of Patent: Nov. 7, 2017

(54) TRANSMISSION OF PROBING PILOTS IN A SHARED RADIO CELL

(71) Applicant: Telefonaktiebolaget L M Ericsson (publ), Stockholm (SE)

(72) Inventors: Sairamesh Nammi, Kista (SE); Per Skillermark, Årsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/903,668

(22) PCT Filed: Nov. 15, 2013

(86) PCT No.: PCT/SE2013/051343
§ 371 (c)(1),
(2) Date: Jan. 8, 2016

(87) PCT Pub. No.: WO2015/012751
PCT Pub. Date: Jan. 29, 2015

(65) Prior Publication Data
US 2016/0173251 A1    Jun. 16, 2016

Related U.S. Application Data

(60) Provisional application No. 61/857,409, filed on Jul. 23, 2013.

(51) Int. Cl.
*H04L 5/00* (2006.01)
*H04W 48/12* (2009.01)
(Continued)

(52) U.S. Cl.
CPC .............. *H04L 5/0048* (2013.01); *H04W 8/22* (2013.01); *H04W 48/12* (2013.01); *H04W 72/085* (2013.01); *H04W 88/02* (2013.01)

(58) Field of Classification Search
CPC ........ H04W 72/08; H04W 8/22; H04W 48/12; H04W 72/085; H04L 5/00; H04L 5/0048
See application file for complete search history.

(56) References Cited

U.S. PATENT DOCUMENTS

2011/0076999 A1* 3/2011 Kazmi ................. H04W 24/10
                                                                 455/423
2011/0237272 A1* 9/2011 Gorokhov .............. H04B 7/024
                                                                 455/452.1
(Continued)

OTHER PUBLICATIONS

Qualcomm Incorporated: "Impact of Combined Cell Operation on Legacy Users in SFN mode", 3GPP TSG RAN WG1 Meeting #73, R1-132430, May 24, 2013 (May 24, 2013), Fukuoka, Japan, XP050698348.*

(Continued)

*Primary Examiner* — Charles C Jiang
*Assistant Examiner* — Kyaw Z Soe
(74) *Attorney, Agent, or Firm* — Patent Portfolio Builders, PLLC

(57) ABSTRACT

The present disclosure concerns radio communication. More particularly, the present disclosure inter alia introduces adaptive utilization of additional pilots, such as probing pilots, in a shared radio cell deployment. According to one embodiment, information on UE capabilities of UEs that are present in the shared radio cell is collecting (110). Based on the thus collected information it is also determined (120) whether there exists any UE that is capable of utilizing probing pilots (e.g. a Rel-12 UE or similar). In response to a determination that there exists at least one UE that is capable of utilizing probing pilots probing pilots are transmitted (130) to the UEs.

18 Claims, 8 Drawing Sheets

(51) Int. Cl.
*H04W 8/22* (2009.01)
*H04W 72/08* (2009.01)
*H04W 88/02* (2009.01)

(56) References Cited

U.S. PATENT DOCUMENTS

2013/0114523 A1* 5/2013 Chatterjee ............ H04J 11/0053
370/329
2013/0343301 A1* 12/2013 Geirhofer ............... H04L 5/001
370/329

OTHER PUBLICATIONS

Qualcomm Incorporated, "Impact of Combined Cell Operation on Legacy Users in SFN mode", 3GPP TSG RAN WG1 Meeting #73, Fukuoka, JP, May 20, 2013, pp. 1-6, R1-132430, 3GPP.

Ericsson, et al., "Overview on Spatial Reuse Mode in Combined Cell Deployment for Heterogeneous Networks", 3GPP TSG RAN WG1 Meeting #73, Fukuoka, JP, May 20, 2013, pp. 1-7, R1-132603, 3GPP.

Ericsson, et al., "Analysis of Probing Pilots for Spatial Reuse", 3GPP TSG RAN WG1 Meeting #72bis, Chicago, US, Apr. 15, 2013, pp. 1-9, R1-131540, 3GPP.

Huawei, et al., "Remaining Considerations on Scheduled Pilots for 4-branch MIMO", 3GPP TSG RAN WG1 Meeting #70, Qingdao, CN, Aug. 13, 2012, pp. 1-7, R1-123815, 3GPP.

Nokia Siemens Networks, "Discussion about HetNet Deployment Scenarios", 3GPP TSG RAN WG1 Meeting #72 bis, Chicago, US, Apr. 15, 2013, pp. 1-4, R1-131597, 3GPP.

Huawei, et al., "Proposed SID: Study on UMTS Heterogeneous Networks", TSG RAN Meeting #57 RP-121436 Chicago, US, Sep. 4, 2012, pp. 1-5, RP-121436, 3GPP.

Ericsson, et al., "Initial considerations on Heterogeneous Networks for UMTS", 3GPP TSG RAN WG1 Meeting #70bis, San Diego, CA, US, Oct. 8, 2012, pp. 1-7, R1-124512, 3GPP.

Ericsson, et al., "Heterogeneous Network Deployment Scenarios", 3GPP TSG-RAN WG1 #70bis, San Diego, CA, US, Oct. 8, 2012, pp. 1-3, R1-124513, 3GPP.

3rd Generation Partnership Project, "3rd Generation Partnership Project; Technical Specification Group Services and System Aspects; Vocabulary for 3GPP Specifications (Release 12)", Technical Report, 3GPP TR 21.905 v12.0.0, Jun. 1, 2013, pp. 1-64, 3GPP, France.

Ericsson, ST-Ericsson, "Link Level Analysis of Spatial Reuse Mode for Combined Cell Deployments with Realistic Channel Estimation", 3GPP TSG RAN WG1 Meeting #73, R1-132604, May 20-24, 2013, pp. 1-14, Fukuoka, Japan.

Ericsson, ST-Ericsson, "System Level Simulation Results in Combined Cell Deployment" 3GPP TSG RAN WG1 Meeting #73, R1-132606, May 20-24, 2013, pp. 1-10, Fukuoka, Japan.

Qualcomm Incorporated, "Preliminary Link Simulations for Combined Cell Scenarios, Agenda Item 6.3.1", 3GPP TSG RAN WG1 Meeting #72bis, R1-131572, Apr. 15-19, 2013, pp. 1-10, Chicago, USA.

* cited by examiner

TRANSMISSION OF PROBING PILOTS IN A SHARED RADIO CELL

TECHNICAL FIELD

Embodiments of the technology presented herein generally relate to radio communication. More particularly, the embodiments presented herein generally relate to methods performed by, or otherwise implemented in, radio network nodes that are operating in a shared radio cell deployment. The disclosure also relates to corresponding radio network nodes that are configured to operate in a shared radio cell deployment.

BACKGROUND

This section is intended to provide a background to the various embodiments of the technology that are described in this disclosure. Therefore, unless otherwise indicated herein, what is described in this section should not be interpreted to be prior art by its mere inclusion in this section.

Radio communication networks are widely deployed to provide various communication services such as telephony, video, data, messaging, broadcasts, and so on. Such radio communication networks support communications for multiple user equipments (UEs) by sharing the available network resources. One example of such a network is the Universal Mobile Telecommunications System (UMTS), a third generation (3G) technology standardized by the 3rd Generation Partnership Project (3GPP). UMTS includes a definition for a Radio Access Network (RAN), referred to as UMTS Terrestrial Radio Access Network (UTRAN). The UMTS, which is the successor to Global System for Mobile Communications (GSM) technologies, supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, third-generation UMTS based on W-CDMA has been deployed in many places of the world. To ensure that this system remains competitive in the future, 3GPP began a project to define the long-term evolution of UMTS cellular technology. The specifications related to this effort are formally known as Evolved UMTS Terrestrial Radio Access (E-UTRA) and Evolved UMTS Terrestrial Radio Access Network (E-UTRAN), but are more commonly referred to by the name Long Term Evolution (LTE). More detailed descriptions of radio communication networks and systems can be found in literature, such as in Technical Specifications published by, e.g., the 3GPP.

Classical Versus Shared Radio Cell Deployments

In the following, the term point is used to mean a point having transmission and/or reception capabilities. As used herein, this term may interchangeably be referred to as "transmission point", "reception point", "transmission/reception point" or "node". To this end, it should also be appreciated that the term point may include devices such as radio network nodes (e.g. evolved NodeB (eNB), a Radio Network Controller (RNC), etc)) and radio units (e.g. Remote Radio Units (RRUs)). As is known among persons skilled in the art, radio network nodes generally differ from RRUs in that the radio network nodes have comparatively more controlling functionality. For example, radio network nodes typically include scheduler functionality, etc., whereas RRUs typically don't. Therefore, RRUs are typically consuming comparatively less computational power than radio network nodes. Sometimes, radio network nodes may therefore be referred to as high power points or high power nodes (HPN) whereas RRUs may be referred to as low power points or low power nodes (LPN). In some cell deployments, LPNs are referred to as pico points and HPNs are referred to as macro points. Thus, macro points are points having comparatively higher power than the pico points.

The classical way of deploying a network is to let different transmission/reception points form separate cells. That is, the signals transmitted from or received at a point is associated with a cell-id (e.g. a Physical Cell Identity (PCI)) that is different from the cell-id employed for other nearby points. Conventionally, each point transmits its own unique signals for broadcast (e.g., PBCH (Physical Broadcast Channel)) and sync channels (e.g., PSS (primary synchronization signal), SSS (secondary synchronization signal)). The classical way of utilizing one cell-id per point is depicted in FIG. 1 for a heterogeneous deployment where a number of LPNs are placed within the coverage area of a HPN. Note that similar principles also apply to classical macro-cellular deployments where all points have similar output power and perhaps are placed in a more regular fashion compared with the case of a heterogeneous deployment.

A recent alternative to the classical cell deployment is to instead let all the UEs within the geographical area outlined by the coverage of the HPN be served with signals associated with the same cell-id (e.g. the same Physical Cell Identity (PCI)). In other words, from a UE perspective, the received signals appear coming from a single cell. This is schematically illustrated in FIG. 2. Note that only one HPN is shown, other HPNs would typically use different cell-ids (corresponding to different cells) unless they are co-located at the same site. In the latter case of several co-located HPNs, the same cell-id may be shared across the co-located HPNs and those LPNs that correspond to the union of the coverage areas of the macro points. Sync channels, BCH (Broadcast Channels) and control channels may all be transmitted from the HPN while data can be transmitted to a UE also from LPNs by using shared data transmissions (e.g. a Physical Downlink Shared Channel (PDSCH)) relying on UE specific resources. In FIG. 2, the HPN may be a radio network node such as a eNB or a RNC to name a few examples. The LPNs may be radio units such as those commonly referred to as Remote Radio Units (RRUs).

The single cell-id approach, or shared radio cell deployment (aka combined radio cell deployment or soft radio cell deployment) can be geared towards situations in which there is fast backhaul communication between the points associated to the same cell. A typical case would be a radio network node serving one or more sectors on a macro level as well as having fast fiber connections to remote radio units (RRUs) playing the role of the other points sharing the same cell-id. Those RRUs could represent LPNs with one or more antennas each. Another example is when all the points have a similar power class with no single point having more significance than the others. The radio network node would then handle the signals from all RRUs in a similar manner.

An advantage of the shared cell approach compared with the classical approach is that the typically involved handover procedure between cells only needs to be invoked on a macro basis. Generally, there is also greater flexibility in coordination and scheduling among the points which means the network can avoid relying on the inflexible concept of semi-statically configured "low interference" subframes as in e.g. 3GPP Release 10 (Rel-10). A shared cell approach may also allow decoupling of the downlink (DL) with the uplink (UL) so that for example path loss based reception point selection can be performed in UL while not creating a severe interference problem for the DL, where the UE may be served by a transmission point different from the point used in the UL reception.

Downlink Transmission Modes in Shared Cell Deployment

There exist different transmission modes in a shared radio cell deployment. The different transmission modes can be divided into:

Single Frequency Network (SFN): In this mode, all nodes transmit the same pilot channel. Also, data and control information are transmitted from all nodes. In this mode, only one UE can be served from all the nodes at any time. Hence, this mode can be said to be useful for coverage improvements. Furthermore, this mode works for legacy UEs. As used in this disclosure the expression "legacy UE" is used to mean a UE that supports 3GPP Rel-5, Rel-6, Rel-7, Rel-8, Rel-9, Rel-10, and/or Rel-11. That is, the expression "legacy UE" refers to pre-release 12 UEs. FIG. 3 shows a pictorial view of the SFN mode. As can be seen in the example of FIG. 3, all nodes (i.e. Macro Node, LPN-1, LPN-2, and LPN-3) utilize the same P-CPICH (Primary Common Pilot Channel). Also, all nodes utilize the same HS-SCCH (High Speed Shared Control Channel). Moreover, all nodes utilize the same HS-PDSCH (High Speed Physical Downlink Shared Channel).

Node selection with Spatial Re-use: In this mode, even though all nodes transmit the same pilot channel, data and control information transmitted from one node is different from the data and control information transmitted from other nodes. For example, a node may be serving a specific UE, while at the same time different data and control information may be sent to a different UE. Hence, the spatial resources can be reused. This mode thus allows for load balancing gains and, accordingly, the capacity of the shared radio cell can be increased. FIG. 4 shows a pictorial view of the Spatial Re-use mode in a shared cell deployment.

In a shared radio cell deployment it is generally the radio network node (sometimes referred to as "the central controller") that takes responsibility for collecting operational information, operational data or operational statistics from various measurements that are made throughout the shared radio cell. Typically, but not necessarily, the decision of which LPN node (e.g. RRU) that should transmit to a specific UE is made by the radio network node based on the collected operational information, operational data or operational statistics. The operational information, operational data or operational statistics may be collected (e.g. obtained, acquired, or received) from the various LPNs. Additionally, or alternatively, this operational information, operational data or operational statistics may be collected from the UEs that are present in the shared radio cell.

Pilots for Supporting Spatial Reuse Mode in a Shared Cell

In a shared radio cell deployment it may be beneficial or useful to utilize additional pilots, i.e. pilots in addition to normal or regular pilots. As used herein "normal" or "regular" pilots refer to pilots such as common pilots. On the other hand, probing pilots (which will be further explained herein) is an example of an additional pilot within the context of this disclosure.

Additional pilots, such as the above-mentioned probing pilots, may be advantageous in a shared radio cell deployment for various reasons, for example:

Identifying which node is the best available (or best suitable) node for a particular UE: In a shared radio cell deployment, all the nodes transmit the same common pilot (C-PICH) and the UE computes, or otherwise determines, a channel quality indicator (CQI) on the basis of the received common pilots. Hence, the central node does not does not know where the UE is located or which nodes should transmit data to a particular UE. This may be seen as a similarity with cell selection in co-channel deployment, where the UE compares the pilot strengths of each node and decide which radio cell sector is the best available, or most suitable, for the UE in question. In a shared radio cell deployment, since all nodes have the same primary scrambling code, the UE cannot generally distinguish between individual pilots.

Data demodulation: In a shared radio cell deployment, a UE is receiving pilots (or pilots signals) from all the nodes for CQI for channel sounding (e.g., CQI computation), while data is transmitted from only one or a subset of nodes. Hence, the channel estimation for data demodulation may become erroneous if the UE would use channel estimation from combined P-CPICHs. In order to estimate the channel in a better way, it may be advantageous to utilize additional pilots, e.g. probing pilots.

Pilot Design Options

Currently, the 3GPP is studying two pilot design options. These two pilot design options are described in R1-132603, "Overview of Spatial Reuse Mode in Combined Cell Deployment for Heterogeneous Networks", which was presented at the 3GPP RAN1#73 meeting in Fukuoka, Japan, $20^{th}$-$24^{th}$ of May, 2013. In brief, the first option (i.e. Option 1) introduces additional pilots in the form of probing pilots which can be transmitted continuously at a relatively low power level, whereas the other option (i.e. Option 2) uses demodulation pilots as probing pilots with a comparatively higher power.

The two design options will now be briefly described:

Option 1—Separate Probing and Demodulation Pilots:

FIG. 5 illustrates a signaling diagram of example messages when utilizing separate probing a demodulation pilots. Assume that a shared radio cell deployment comprises four nodes (or transmission points) serving multiple UEs. It should be appreciated that the same procedure is applicable also in scenarios where the node are less than or more than four. A reference signal which is unique to each node in a shared cell called fractional CPICH (F-CPICH) is transmitted from each node simultaneously and continuously. The F-CPICH is generally characterized by a spreading code (typically SF=256 (SF is an abbreviation for Spreading Factor)) and a scrambling code which is either the primary scrambling code or a secondary scrambling code of the shared radio cell. The F-CPICH channel power levels may be indicated to the UE during the initial cell set up. In addition to F-CPICH, the primary common pilot (P-CPICH) which is common to all the nodes is continuously transmitted. From these two different pilot signals, the UE can estimate the channel and feed back the channel quality information (CQI) associated with these two pilots at two time intervals. Note that the CQI estimated with F-CPICH indicates the channel quality corresponding to the specific node, referred to hereafter as $CQI_F$, and the CQI computed using P-CPICH is the channel quality using the combined nodes, referred to hereafter as $CQI_P$. These two CQIs are generally time multiplexed and sent on the uplink feedback channel HS-DPCCH. The same HS-DPCCH signal is received by all the nodes. The central processing unit (e.g., the radio network node (such as a RNC or eNB)) can process the received signal (HS-DPCCH) from all the nodes. From $CQI_F$ a scheduler or similar entity of the central processing unit identifies which node the UE is close to. Hence the central processing unit can inform the respective node to transmit to the UE. The assigned node transmits the demodulation pilot channel (D-CPICH), downlink control channel (HS-SCCH) and the downlink traffic channel (HS-PDSCH) to the respective UE. Similarly, the central processing unit informs the other nodes to transmit to the other UEs. Note that D-CPICH and F-CPICH use different spreading codes and may have different power levels. For example, the power level of F-CPICH may be relatively low and D-CPICH may be relatively high.

Option 2—Joint Probing and Demodulation Pilot:

FIG. 6 illustrates a signaling diagram of example messages when utilizing joint probing a demodulation pilots. Assume that a shared radio cell deployment comprises four nodes (or transmission points) serving multiple UEs. It should be appreciated that the same procedure is applicable also in scenarios where the node are less than or more than four. Instead of probing pilots, demodulation pilots are used from each node. In addition, all the nodes transmit the same pilot signal P-CPICH. Note that channel sounding for CQI estimation is generally done on D-CPICH. From the D-CPICH signal, the UE can estimate the channel and feed back the channel quality information (CQI). The CQI information is sent in HS-DPCCH. The same HS-DPCCH signal is received by all nodes. The central processing unit processes the CQIs and identifies which node(s) the UE is closest to. Hence the central processing unit informs the respective node to transmit to the UE. The assigned node transmits the downlink control channel (HS-SCCH) and the downlink traffic channel (HS-PDSCH) to the respective UE. Note that in this option, D-CPICH should be continuously transmitted from each node. Generally, compared with option 1, D-CPICH would need a comparatively higher power as it is used for data demodulation.

SUMMARY

It is in view of the above considerations and others that the various embodiments disclosed herein have been made. The inventors have realized that the introduction of additional pilots such as probing pilots in shared radio cell deployments may cause a potential negative impact on legacy UEs. For example, the transmission of these additional pilots needs a certain power for transmission. Typically, but not necessarily, pilot powers in the range of −10 to −16 dB are used for transmission from each node. Consequently, the power allocated to the data channels (e.g., HS-PDSCH) may be reduced due to the allocation of the additional pilot power. As a further consequence, the radio link throughput may become reduced with these additional pilots.

Therefore, it is a general aim to reduce the transmission power level for the transmission of pilots in shared radio cell deployments. Also, it is an aim to reduce or counteract any negative impact being the result of the introduction of additional pilots such as probing pilots in shared radio cell deployments. As such, it is an aim to reduce the potential negative impact on legacy UEs when additional pilots such as probing pilots are introduced in shared radio cell deployments. For example, it is an aim to provide for a radio link throughput that is acceptable for legacy UEs.

The embodiments described throughout this disclosure address one or several of the above-mentioned aims.

In one of its aspects, the technology presented herein concerns a method performed by a radio network node, such as a Radio Network Controller (RNC) or an evolved NodeB (eNB). The radio network node is operating in a shared radio cell deployment, a.k.a combined radio cell deployment. In such shared radio cell deployment, several radio units (such as remote radio units (RRUs)) are controlled by the radio network node. Also, each of the several radio units is serving a respective radio cell sector of a shared radio cell. The method comprises collecting (e.g. obtaining, acquiring, or receiving) information on UE capabilities of one or more UEs that are present in the shared radio cell. Based on the collected information, it is determined whether there exists at least one UE that is capable of utilizing probing pilots. As used herein, the expression "probing pilots" is used to mean pilots that are used for checking which one of several radio cell sectors is the best available radio cell sector for the UE in question.

Furthermore, the method comprises transmitting probing pilots to the UEs when it has been determined that there exists at least one UE that is capable of utilizing probing pilots, i.e. there exists at least one UE that supports the utilization (or, use) of probing pilots.

Hereby it is made possible to keep the power level for the transmission of probing pilots at an acceptable level. The probing pilots are only transmitted, and thus utilized, when it has first been determined that there exists at least one UE that is capable of utilizing probing pilots. By only utilizing the probing pilots when UEs supporting the utilization of such probing pilots are present, it is possible to achieve acceptable transmission power levels for the transmission of pilots.

One example UE which would support the utilization (or, use) of probing pilots is a Release 12 (Rel-12) UE. A Rel-12 UE is a UE that is configured to operate according to the 3GPP Rel-12 Technical Specifications. It is conceivable that UEs that are configured to operate according to any future 3GPP releases (e.g. Rel-13 and/or beyond) are also of a UE type, which would support the utilization of probing pilots. Since the density of Rel-12 UEs will most likely be sparse initially, it can be expected that the utilization of the probing pilots can be adaptively changed depending on whether there are Rel-12 UEs present in the shared radio cell or not. If there is no Rel-12 UE present, the probing pilots are not utilized. However, the probing pilots are utilized when there exists at least one Rel-12 UE. This way, the legacy UEs are not impacted too much (e.g. due to less interference and more power allocated to data transmissions) and at the same time the performance of the Rel-12 UEs is not impacted too much either.

In one embodiment, the method comprises determining the number of UEs that are capable of utilizing probing pilots; comparing the determined number of UEs with a first threshold value; determining that said probing pilots are to be utilized when the determined number of UEs is equal to or above said first threshold value; and determining that said probing pilots are not to be utilized when the determined number of UEs is below said first threshold value. The first threshold value may, for example, be any of the following values: 1, 2, 3, 4, 5, 10, 15, 20, 30, 40, 50, 100. Accordingly, the utilization of the probing pilots can be enabled or disabled depending on how many UEs there exists that are capable of utilizing probing pilots.

In a further embodiment, the method additionally comprises determining a traffic load of the shared radio cell; comparing the determined traffic load of the shared cell with a second threshold value; determining that said probing pilots are to be utilized and thus continuing to utilize said probing pilots when the determined traffic load of the shared cell is equal to or above said second threshold value; and determining that said probing pilots are not to be utilized and thus disabling the utilization of probing pilots when the determined traffic load of the shared cell is below said second threshold value. Accordingly, the utilization of the probing pilots can be enabled or disabled depending on the traffic load of the shared radio cell.

In still another embodiment, the method comprises determining a location of the at least one UE that is capable of utilizing probing pilots; determining whether probing pilots are to be utilized in dependence of the determined location of said at least one UE that is capable of utilizing probing pilots. For example, the determining of said location of said at least one UE that is capable of utilizing probing pilots may involve collecting (e.g. obtaining, acquiring, or receiving) location information from each one of the radio units. This location information comprises information indicative of the location of the at least one UE that is capable of utilizing probing pilots. If there exists more than one such UE, the location information comprises information indicative of the location of each of the multiple UEs. In one embodiment, the location information comprises information about measured signal parameters, such as PSRP (Probing Signal Received Power) and/or PSRQ (Probing Signal Received Power).

In yet another embodiment, the method comprises comparing a total sum of all measured signal parameters with a third threshold value; determining that said probing pilots are to be utilized and thus continuing to utilize said probing pilots when the total sum of all measured signal parameters is equal to or above said third threshold value; and determining that said probing pilots are not to be utilized and thus disabling the utilization of probing pilots when the total sum of all measured signal parameters is below said third threshold value.

In another of its aspects, the technology presented herein concerns a radio network node, such as an RNC or an eNB. The radio network node is configured to operate in a shared radio cell deployment. In such shared radio cell deployment, several radio units may be controlled by the radio network node. Also, each of the several radio units may be configured to serve a respective radio cell sector of a shared radio cell. The radio network node comprises means adapted to collect information on UE capabilities of UEs that are present in the shared radio cell. The radio network node also comprises means adapted to determine, based on the collected information, whether there exists at least one UE that is capable of utilizing probing pilots for checking which one of several radio cell sectors is the best available radio cell sector for the UE in question. Yet further, the radio network node comprises means adapted to transmit probing pilots to the UEs when it has been determined that there exists at least one UE that is capable of utilizing probing pilots.

In one embodiment, the radio network node may comprise means adapted to determine the number of UEs that are capable of utilizing probing pilots. Also, means adapted to compare the determined number of UEs with a first threshold value may be provided. Furthermore, means adapted to determine that said probing pilots are to be utilized when the determined number of UEs is equal to or above said first threshold value may be provided. Moreover, the radio network node may comprise means adapted to determine that said probing pilots are not to be utilized when the determined number of UEs is below said first threshold value. Again, the first threshold value may be any of the following values: 1, 2, 3, 4, 5, 10, 20, 30, 40, 50, 100.

In one embodiment, the radio network may comprise means adapted to determine a traffic load of the shared radio cell. Means adapted to compare the determined traffic load of the shared cell with a second threshold value may also be provided. Also, the radio network node may comprise means adapted to determine that said probing pilots are to be utilized and thus continue to utilize said probing pilots when the determined traffic load of the shared cell is equal to or above said second threshold value. Furthermore, the radio network node may comprise means adapted to determine that said probing pilots are not to be utilized and thus disable the utilization of probing pilots when the determined traffic load of the shared cell is below said second threshold value.

In one embodiment, the radio network node may comprise means adapted to determine a location of the at least one UE that is capable of utilizing probing pilots as well as means adapted to determine whether probing pilots are to be utilized in dependence of the determined location of said at least one UE that is capable of utilizing probing pilots. Means adapted to collect location information from each one of the radio units may also be provided. The location information may comprise information indicative of the location of each of said one or several UEs that are capable of utilizing probing pilots. For example, the location information may comprise information about measured signal parameters such as PSRP (Probing Signal Received Power) and PSRQ (Probing Signal Received Power).

In one embodiment, the radio network node may comprise means adapted to compare a total sum of all measured signal parameters with a third threshold value, means adapted to determine that said probing pilots are to be utilized and thus continue to utilize said probing pilots when the total sum of all measured signal parameters is equal to or above said third threshold value, and means adapted to determine that said probing pilots are not to be utilized and thus disable the utilization of probing pilots when the total sum of all measured signal parameters is below said third threshold value.

In yet another of its aspects, the technology presented herein concerns an implementation of a radio network node, such as an RNC or an eNB. The radio network node is configured to operate in a shared radio cell deployment. In such shared radio cell deployment, several radio units may be controlled by the radio network node. Also, each of the several radio units may be configured to serve a respective radio cell sector of a shared radio cell. The radio network node comprises a communication interface for communication with the several radio units and for communication with at least one UE. The radio network node also comprises a processor and a memory. The memory stores computer program code which, when run in the processor, causes the radio network node to collect (e.g. obtaining, acquiring, or receiving) information on UE capabilities of UEs that are present in the shared radio cell; based on the collected information, determining whether there exists at least one UE that is capable of utilizing probing pilots for checking which one of several radio cell sectors is the best available radio cell sector for the UE in question; wherein the communications interface is configured to transmit the probing pilots to the UEs responsive to a determination that there exists at least one UE that is capable of utilizing probing pilots.

Again, one example UE which would support the utilization (or, use) of probing pilots is a Release 12 (Rel-12) UE. A Rel-12 UE is a UE that is configured to operate according to the 3GPP Rel-12 Technical Specifications. It is conceivable that UEs that are configured to operate according to any future 3GPP releases (e.g. Rel-13 and/or beyond) are also of a UE type, which would support the utilization of probing pilots.

In one embodiment, the memory stores computer program code, which, when run in the processor causes the radio network node to determine the number of UEs that are capable of utilizing probing pilots; compare the determined number of UEs with a first threshold value; determine that said probing pilots are to be utilized when the determined number of UEs is equal to or above said first threshold value; and determine that said probing pilots are not to be utilized when the determined number of UEs is below said first threshold value. The first threshold value may e.g. be any of the following values: 1, 2, 3, 4, 5, 10, 15, 20, 30, 40, 50, 100.

In a further embodiment, the memory stores computer program code, which, when run in the processor causes the radio network node to determine a traffic load of the shared radio cell; compare the determined traffic load of the shared cell with a second threshold value; determine that said probing pilots are to be utilized and thus continuing to utilize said probing pilots when the determined traffic load of the shared cell is equal to or above said second threshold value; and determine that said probing pilots are not to be utilized and thus disabling the utilization of probing pilots when the determined traffic load of the shared cell is below said second threshold value.

In still another embodiment, the memory stores computer program code, which, when run in the processor causes the radio network node to determine a location of the at least one UE that is capable of utilizing probing pilots; determine whether probing pilots are to be utilized in dependence of the determined location of said at least one UE that is capable of utilizing probing pilots. In one embodiment, the radio network node is configured to collect (e.g. obtaining, acquiring, or receiving) location information from each one of the radio units, the location information comprising information indicative of the location of each of said one or several UEs that are capable of utilizing probing pilots. The location information may comprise information about measured signal parameters such as PSRP (Probing Signal Received Power) and/or PSRQ (Probing Signal Received Power).

In still another embodiment, the memory stores computer program code, which, when run in the processor causes the radio network node to compare a total sum of all measured signal parameters with a third threshold value; determine that said probing pilots are to be utilized and thus continuing to utilize said probing pilots when the total sum of all measured signal parameters is equal to or above said third threshold value; and determine that said probing pilots are not to be utilized and thus disabling the utilization of probing pilots when the total sum of all measured signal parameters is below said third threshold value.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The technology will now be described more fully hereinafter with reference to the accompanying drawings, in which certain embodiments are shown. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

As used in this disclosure, the term "user equipment (UE)" is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC devices, which do not necessarily involve human interaction. In this regard, it should also be appreciated that the term "user equipment (UE)" as used herein may apply the definition as specified on page 33 of 3GPP TR 21.905 V.12.0.0 (2013-06).

In one of its aspects, the technology presented herein concerns adaptive utilization of additional pilots, such as probing pilots, in a shared radio cell deployment.

Figure 1:
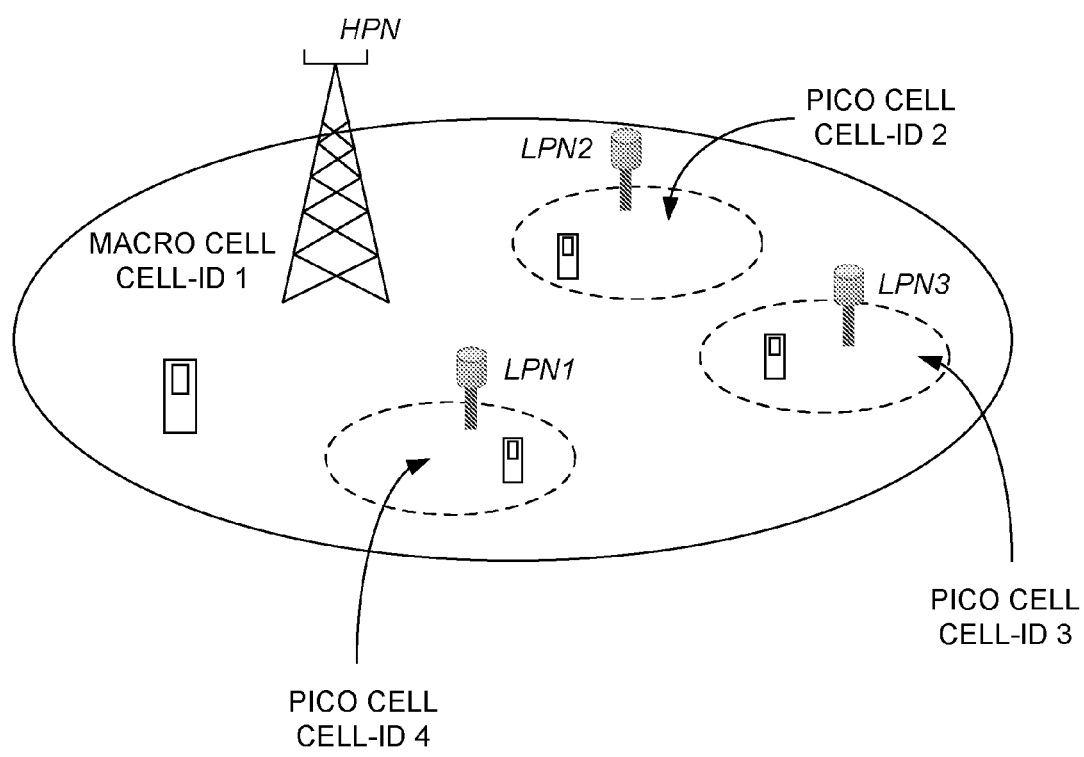
FIG. 1 shows an example of a heterogeneous radio network utilizing a classical cell deployment.
Figure 2:
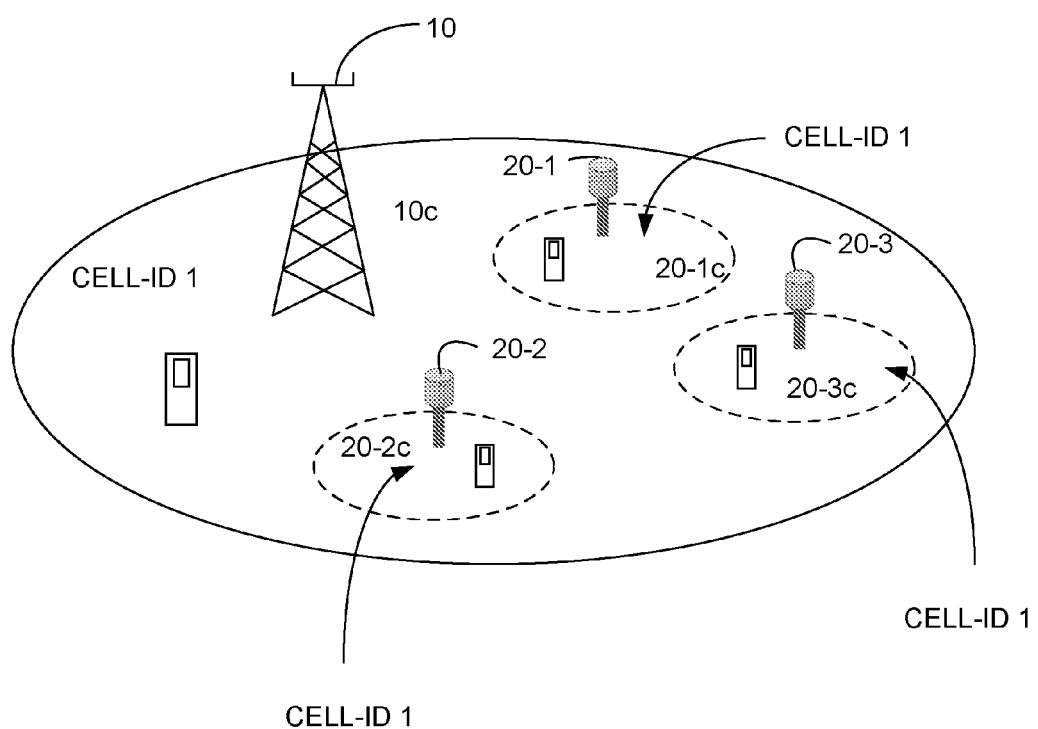
FIG. 2 shows an example of a radio network utilizing a shared cell deployment.
Figure 3:
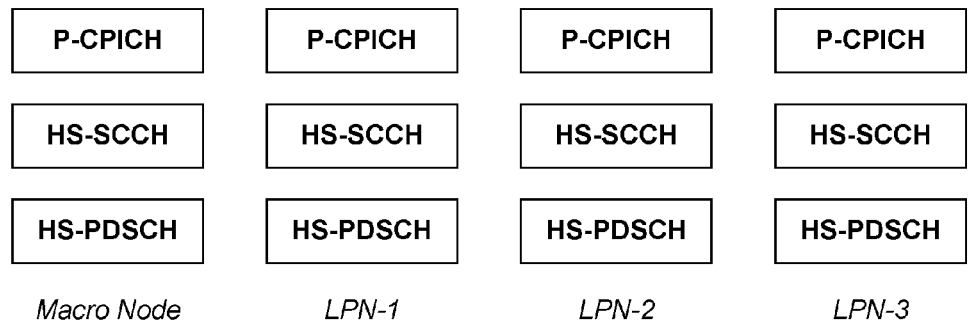
FIG. 3 shows a pictorial view of SFN in a shared radio cell deployment.
Figure 4:
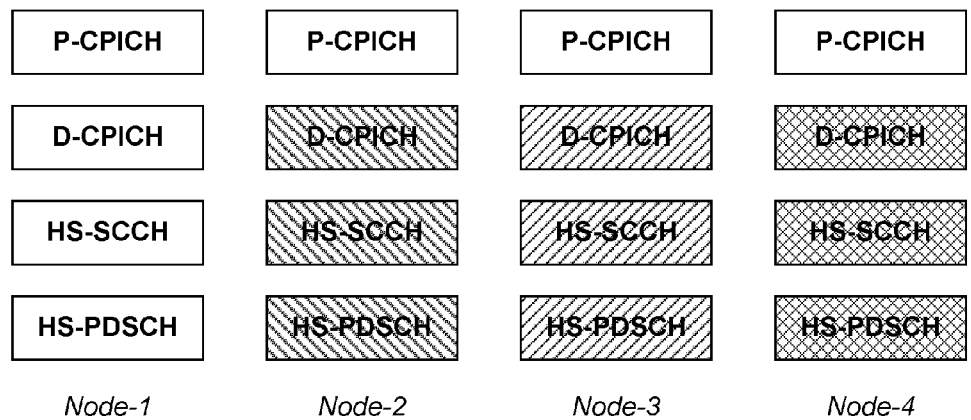
FIG. 4 shows a pictorial view of Spatial Re-use in a shared radio cell deployment.
Figure 5:
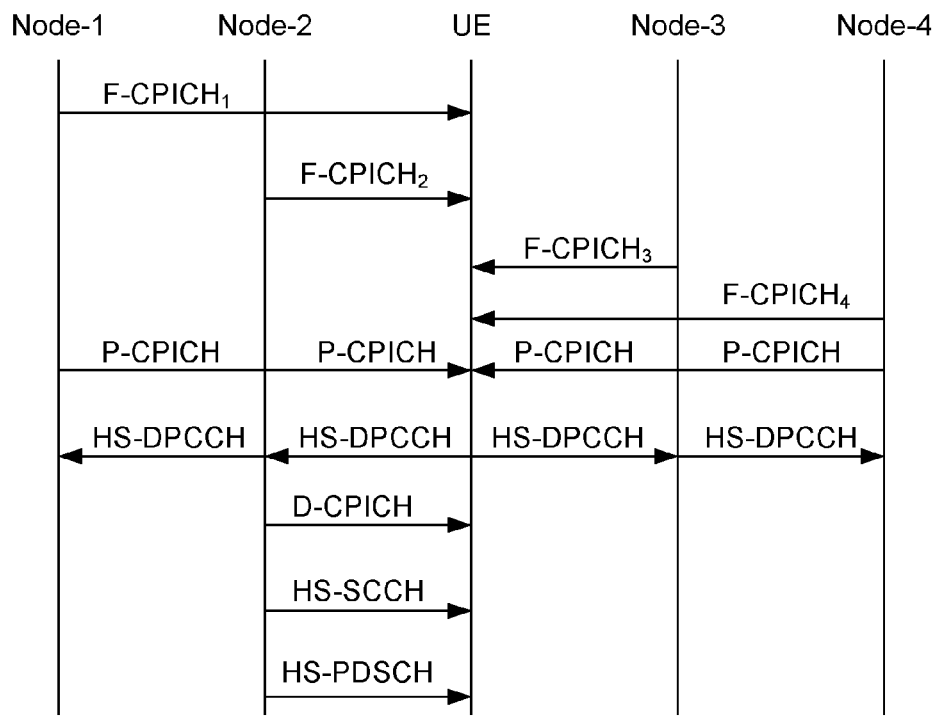
FIG. 5 is a message sequence chart showing messages between nodes and a UE using F-CPICH.
Figure 6:
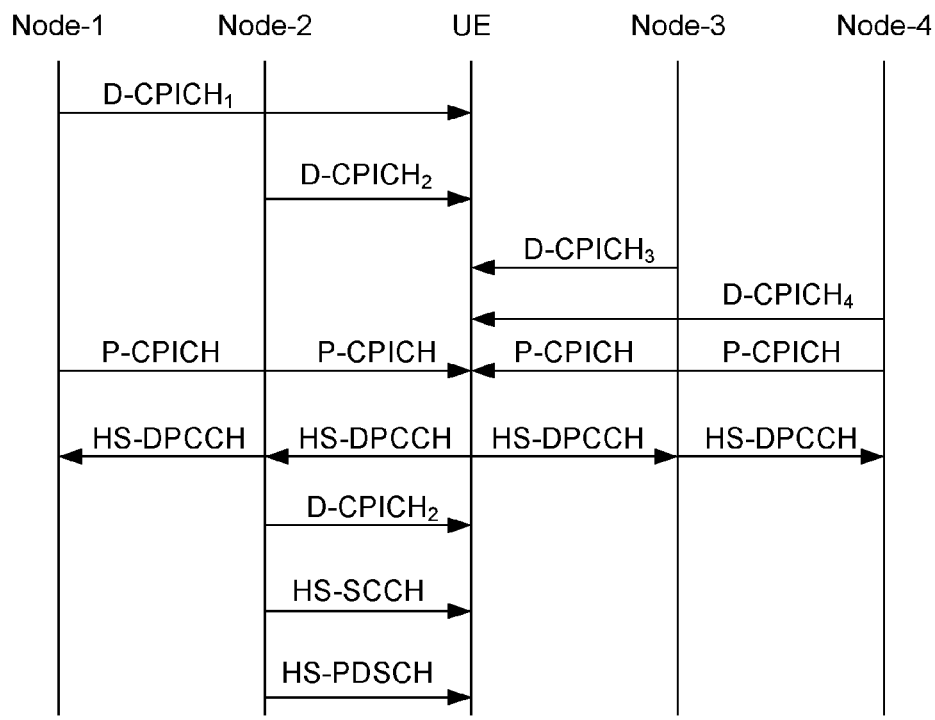
FIG. 6 is a message sequence chart showing messages between nodes and a UE using D-CPICH.
Figure 7:
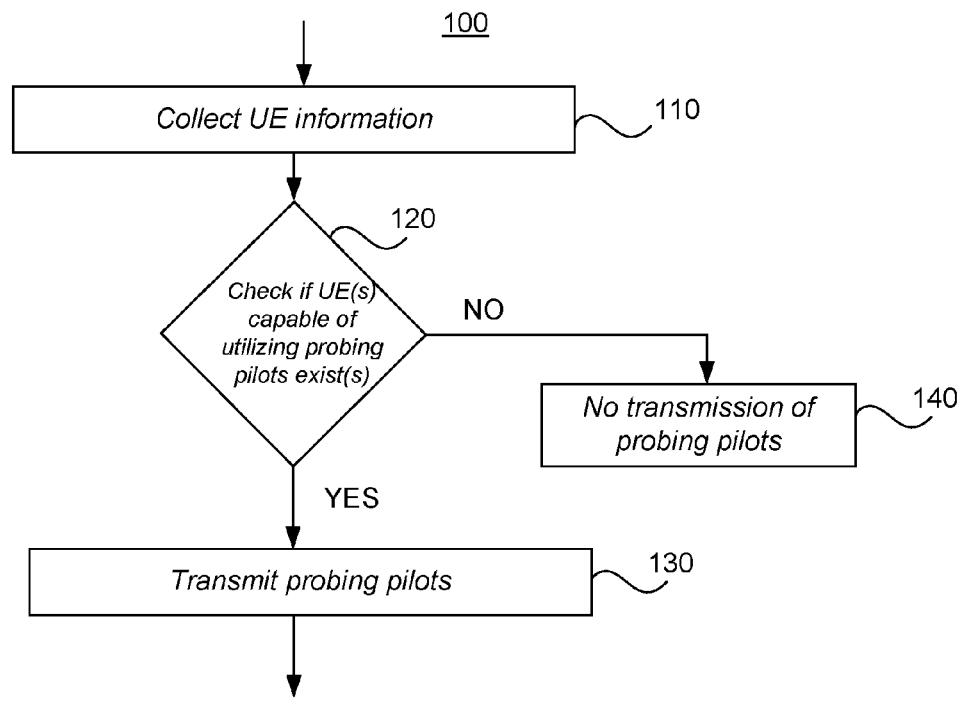
FIGS. 7-11 show example methods according to various embodiments of the technology described throughout this disclosure

FIG. 7 shows a flowchart of a method 100 performed by, or otherwise implemented in a radio network node 10 (see FIG. 2). The radio network node 10 may be referred to as a macro node, central processing unit, or HPN. The radio network node 10 may e.g. be implemented as a RNC or as a eNB. The radio network node 10 is operating in a shared radio cell deployment (see FIG. 2). In such shared radio cell deployment, several radio units 20-1, 20-2, 20-3 (e.g., remote radio units (RRUs)) are controlled by the radio network node 10. Also, each of the several radio units 20-1, 20-2, 20-3 is serving a respective radio cell sector 20-1c, 20-2c, 20-3c of the shared radio cell 10c. The radio units may also be referred to as LPNs.

With reference to FIG. 7, information on UE capabilities of one or more UEs that are present in the shared radio cell is collected 110. The collection of the information on UE capabilities may comprise obtaining, acquiring or receiving said information on UE capabilities. This collection of the information on UE capabilities can be performed in various ways. In some embodiments, the radio network node 10 collects this information from the radio units 20-1, 20-2,

20-3. For example, the radio network node 10 may receive radio signals (e.g. continuously or at certain intervals) from the radio units 20-1c, 20-2c, 20-3c, wherein the radio signals comprise the information on UE capabilities. In this case, the various radio units 20-1c, 20-2c, 20-3c may have collected (e.g., received) this information on UE capabilities from the UEs that are present in the different radio sectors 20-1c, 20-2c, 20-3c of the shared radio cell 10-c before this information on UE capabilities is relayed, or forwarded, to the radio network node 10. Alternatively, or additionally, the radio network node 10 may receive radio signals (e.g. continuously or at certain intervals) directly from the UEs that are present in the shared radio cell 10c, wherein the radio signals comprise the information on UE capabilities.

In some embodiments, the collection of UE capabilities may involve collecting information on UE category. For example, a UE may be of UE category "Rel-12 UE", i.e. a UE that supports 3GPP Rel-12. The radio network node may receive radio signals from the UEs, wherein the radio signals comprise an information element (IE) indicating the UE category. Thus, the radio network node 10 can be informed whether there exists UEs of category "Rel-12 UE". Alternatively, or additionally, the UE category of the various UEs can be signaled via the radio units 20-1, 20-2 and 20-3 such that the radio network node 10 can collect (e.g. receive) this information from the radio units 20-1, 20-2 and 20-3. In this case, the UEs that are present in the shared radio cell 10c may transmit signals to the respective radio units 20-1, 20-2 and 20-3 indicating their respective UE category.

The above-mentioned radio signals (including the information on UE capabilities) can be signaled from the radio units 20-1, 20-2, 20-3 and/or UEs on request from a requesting node (i.e. the radio network node 10 or the radio units 20-1, 20-2, 20-3). Alternatively, the radio signal can be transmitted from the UEs to the radio network node 10 and/or the radio units 20-1, 20-2, 20-3 without any preceding request.

Based on the collected information, it is determined 120 whether there exists at least one UE that is capable of utilizing probing pilots. The probing pilots are generally used for checking which one of the several radio cell sectors 20-1a, 20-2c, 20-3c is the best available radio cell sector for a UE in question.

When it has been determined 120 that there exists at least one UE that is capable of utilizing probing pilots, i.e. there exists at least one UE that supports the utilization (or, use) of probing pilots, then the radio network node 10 is configured to transmit 130 probing pilots to the UEs. If so, the probing pilots may be transmitted (e.g. broadcasted) from the radio network node 10 to all UEs that are within the coverage area of the shared radio cell 10c. When it has been determined 120 that there exists no UE that is capable of utilizing probing pilots, then radio network is configured not to transmit 140 probing pilots to the UEs. That is, the utilization of probing pilots can be said to be disabled.

Consequently, the probing pilots are only transmitted, and thus utilized, when it has first been determined that there exists at least one UE that is capable of utilizing probing pilots. By utilizing the probing pilots only when UEs supporting the utilization of such probing pilots are present, it is made possible to keep the power level for the transmission of probing pilots at an acceptable level.

As described earlier, one example UE which would support the utilization (or, use) of probing pilots is a Release 12 (Rel-12) UE. A Rel-12 UE is a UE that is configured to operate according to the 3GPP Rel-12 Technical Specifications. Since the density of Rel-12 UEs will most likely be sparse initially, it can be expected that the utilization of the probing pilots can be adaptively changed depending on whether there are Rel-12 UEs present in the shared radio cell or not. If there is no Rel-12 UE present, the probing pilots are not utilized whereas the probing pilots are utilized when there exists at least one Rel-12 UE. This way, the legacy UEs are not impacted too much (e.g. due to less interference and more power allocated to data transmissions) and at the same time the performance of the Rel-12 UEs is not impacted too much either.

Figure 8:
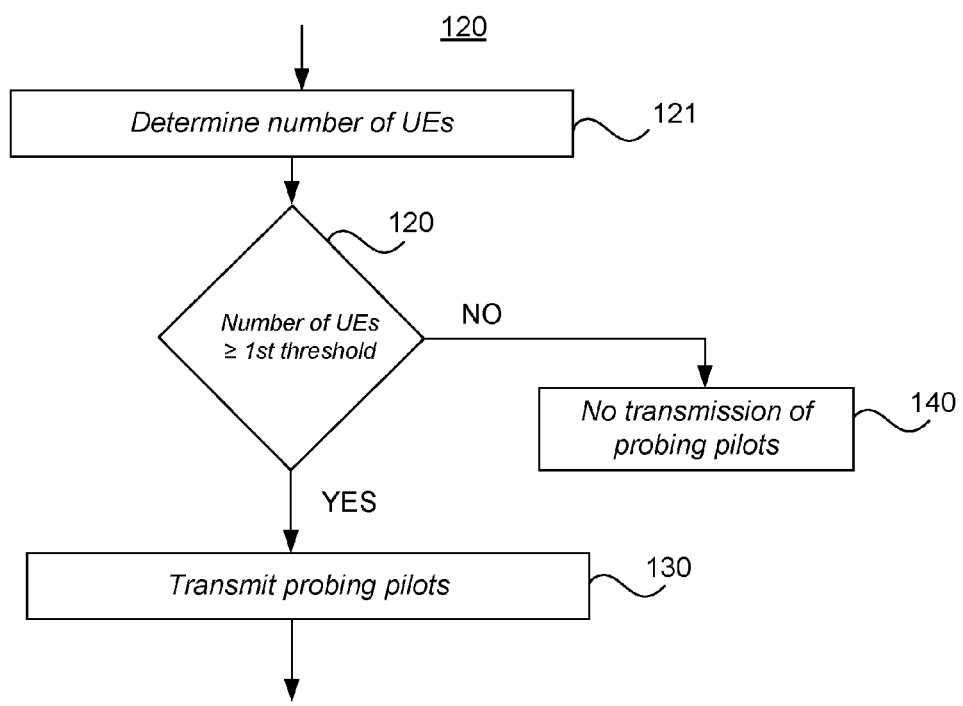

FIG. 8 shows a flowchart of an embodiment of the method 100 illustrated in FIG. 7. With reference to FIG. 8, the number of UEs that are capable of utilizing probing pilots is determined 121 or otherwise counted. This determined number of UEs is compared 122 with a first threshold value. The first threshold value may preferably be one (1). However, the first threshold value may alternatively be any of the following values: 2, 3, 4, 5, 10, 15, 20, 30, 40, 50, 100. The exact value of the first threshold value has to be tested and evaluated for each specific case, e.g., depending on operator needs, end-user experience demands, end-user experience requirements, etc. If, or when, it is determined 122 that the determined number of UEs is equal to or above said first threshold value then it is determined 130 that the probing pilots are to be utilized (and thus transmitted). On the other hand, when it is determined 122 that the determined number of UEs is below said first threshold value then it is determined 140 that the probing pilots are not to be utilized (and thus not transmitted). Accordingly, the utilization of the probing pilots can be enabled or disabled depending on how many UEs there exists that are capable of utilizing probing pilots.

Figure 9:
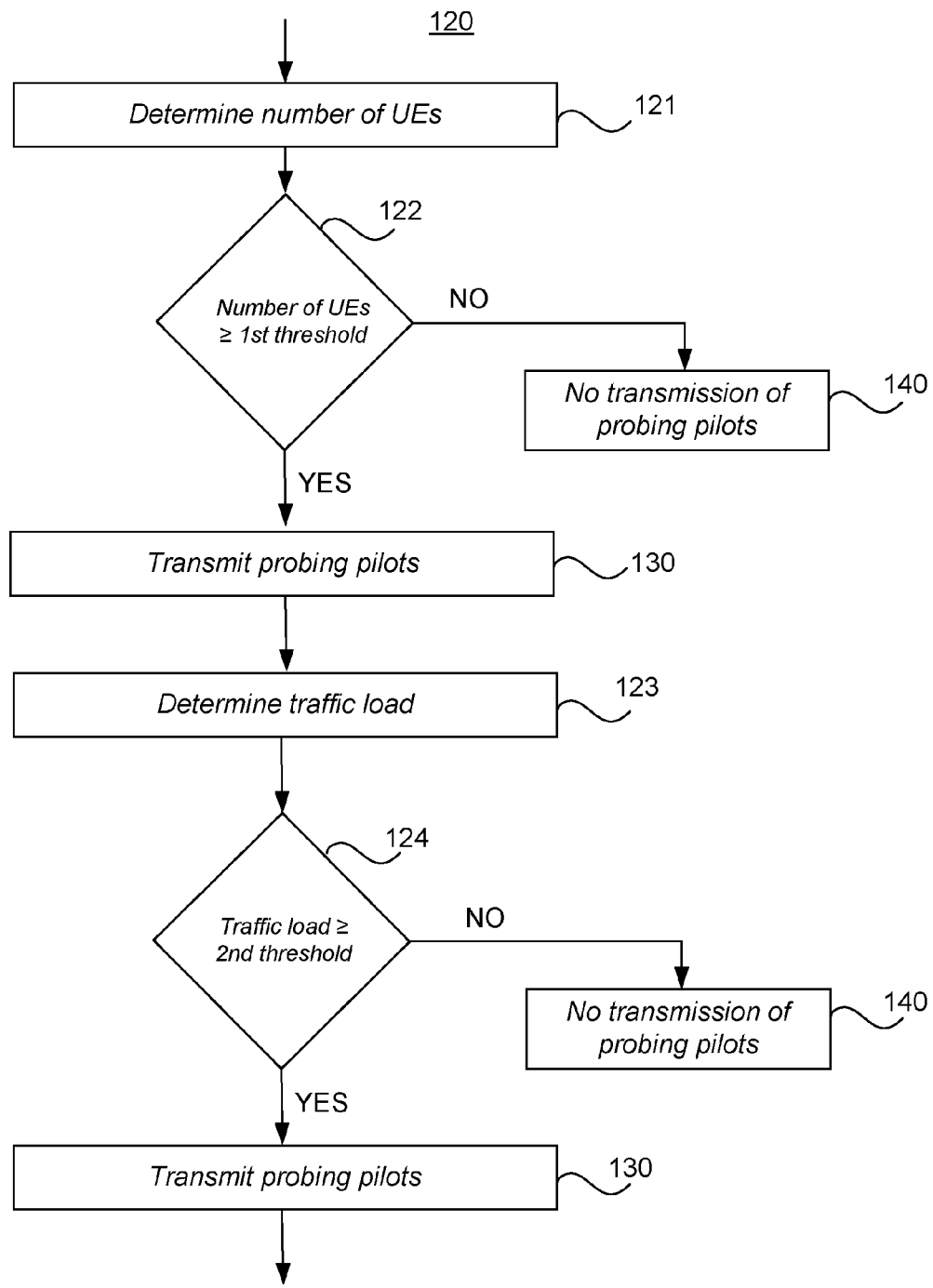

FIG. 9 shows a flowchart of another embodiment of the method 100 illustrated in FIG. 7. FIG. 9 is similar to FIG. 8, but includes more steps or acts. The steps or acts 121, 122, etc. which have already been described will therefore not be repeated here. With reference to FIG. 9, a traffic load of the shared radio cell is determined 123. The determined traffic load is also compared 124 with a second threshold value. The exact value of the second threshold value has to be tested and evaluated for each specific case, e.g., depending on operator needs, end-user experience requirements, end-user experience demands, etc. If, or when, the determined traffic load of the shared cell is equal to or above this second threshold value then it is determined 130 that the probing pilots are to be utilized and, consequently, the radio network node continues to utilize (thus, transmit) probing pilots to the UEs within the coverage area of the shared radio cell. If, or when, the determined traffic load of the shared cell is below the second threshold value then it is determined 140 that that the probing pilots are not to be utilized and thus the radio network node 10 disables the utilization of probing pilots. Hence, the radio network node 10 stops using the probing pilots, at least temporarily. In the case when the utilization of probing pilots has been disabled, it is possible to re-active the utilization (and thus subsequent transmission) of probing pilots, e.g. after a certain period of time. In some embodiments, the utilization of probing pilots is re-activated in response to the determined traffic load increasing to a level which is equal to or above the second threshold value.

As is known among persons skilled in the art, there exist various ways of determining the traffic load in a radio cell. The exact way, or technique, to determine or estimate the traffic load should be tested and evaluated for each specific case. Hereinbelow are a few example methods that could be used:

1. Code usage: Generally, in every TTI (Transmission Time Interval) the scheduler of the radio network node needs to assign e.g. 15 codes per node. The radio network node 10 may be configured to track the number of codes for a certain duration of TTIs and based thereon compute the total number of codes. The total number of codes that are scheduled gives an indication of the load of the cell.
2. Transmit power. Similar to the above technique instead of number of codes, the radio network node 10 may be configured to keep track of the transmit power in each TTI. The transmit power level gives an indication of the load of the radio cell.
3. TTI utilization: The radio network node 10 may be configured to check how many TTIs that are utilized during a certain period of time and this can give an estimate of the load of the cell.

Figure 10:
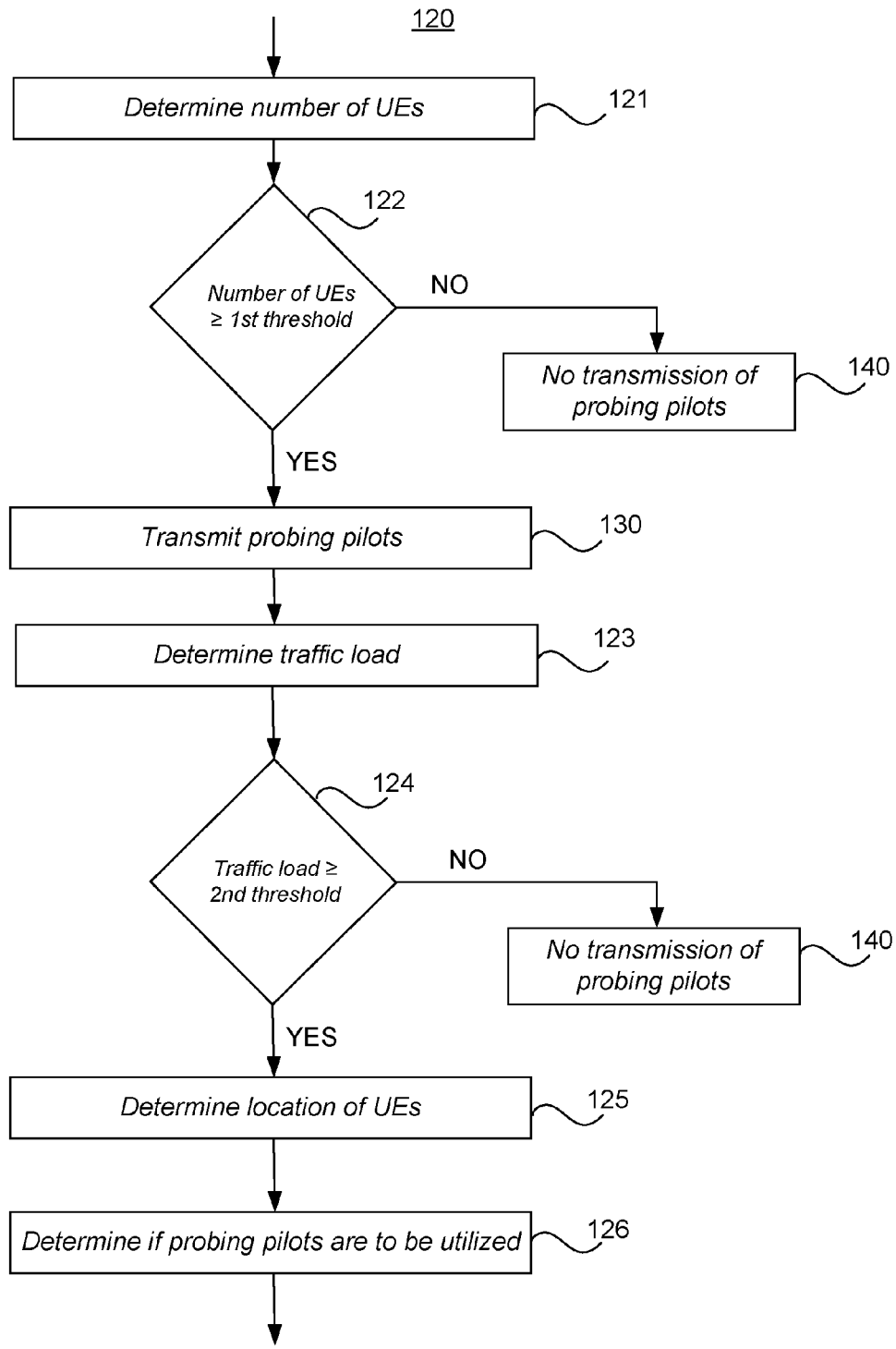

FIG. 10 shows a flowchart of another embodiment of the method 100 illustrated in FIG. 7. FIG. 10 is similar to FIG. 9, but includes more steps or acts. The steps or acts 121, 122, 123, 124 etc. which have already been described will therefore not be repeated here. With reference to FIG. 10, a location of the at least one UE that is capable of utilizing probing pilots is determined 125. It is also determined 126 whether probing pilots are to be utilized. This is performed in dependence of the determined location of said at least one UE that is capable of utilizing probing pilots.

For example, the determination 125 of said location of the at least one UE that is capable of utilizing probing pilots may involve collecting (e.g. obtaining, acquiring) location information from each one of the radio units 20-1, 20-2, 20-3. For example, the radio network node 10 may receive radio signals from each one of the radio units 20-1, 20-2, 20-3, wherein the radio signals comprises information elements indicating the UE locations of one or several UEs that are present within the coverage area of the shared radio cell 10c. The location information thus comprises information indicative of the location of the at least one UE that is capable of utilizing probing pilots. If there exists more than one such UE, the location information comprises information indicative of the location of each of the multiple UEs.

Figure 11:
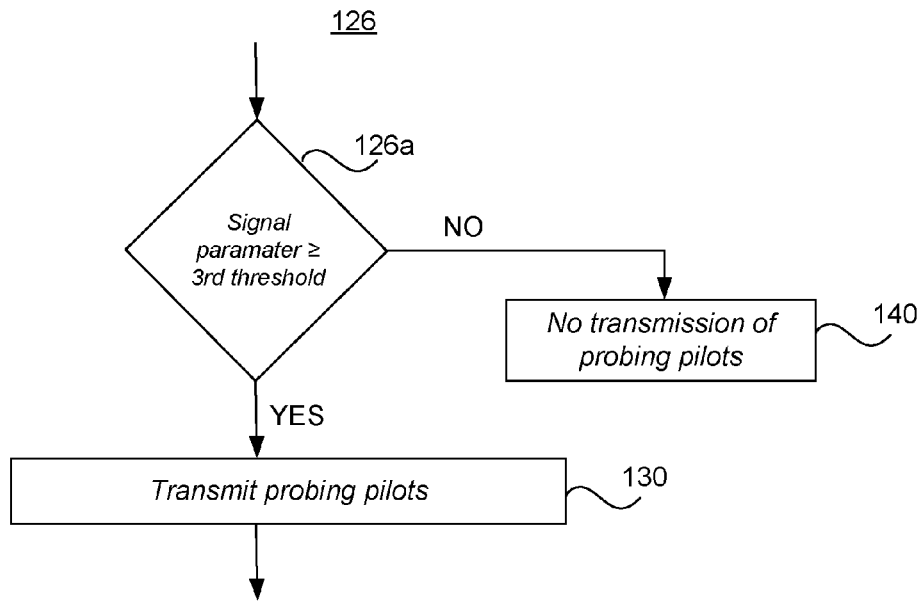

With reference to an embodiment, which is illustrated in FIG. 11, the above-mentioned location information may comprise information about measured signal parameters. The method may comprise comparing 126a a total sum of all measured signal parameters with a third threshold value. The exact value of the third threshold value has to be tested and evaluated for each specific case, e.g., depending on operator needs, end-user experience requirements, end-user experience demands, etc. If, or when, the total sum of all measured signal parameters is equal to or above the third threshold value then it is determined 130 that the probing pilots are to be utilized and thus the radio network node 10 continues to utilize (and thus transmit) the probing pilots. If, or when, the total sum of all measured signal parameters is below the third threshold value then it is determined 130 that the probing pilots are not to be utilized. Thus the radio network node 10 stops utilizing the probing pilots. In other words, the utilization of probing pilots is disabled by the radio network node 10. In the case when the utilization of probing pilots has been disabled, it is possible to re-active the utilization (and thus subsequent transmission) of probing pilots, e.g. after a certain period of time. In some embodiments, the utilization of probing pilots can be re-activated in response to that the total sum of all measured signal parameters is again above or equal to the third threshold value.

The measured signal parameter referred to hereinabove may be a PSRP (Probing Signal Received Power). Alternatively, or alternatively, the measured signal parameter may be PSRQ (Probing Signal Received Quality). As mentioned earlier, the probing pilot is a pilot that is transmitted to one or several UEs for the purpose of checking which one of several radio cell sectors is the best available radio cell sector for the UE in question. The transmission of a probing pilot from the radio network node 10 to the UEs may be seen as a request signal for requesting the UE to check its channel condition (or channel quality). Thus, in response to receiving a probing pilot the UEs may return (i.e. transmit) the respective measured signal parameter, e.g. PSRP and/or PSRQ. The PSRP and/or PSRQ is/are thus indicative of the channel condition.

In alternative embodiments, it is not necessary to compare the total sum of all measured signal parameters with a third threshold value. Instead, it may be sufficient to determine a measured signal parameter (e.g. PSRP and/or PSRQ) with respect to individual UEs. If the determination yields that the measured signal parameter (e.g. PSRP and/or PSRQ) is relatively low for all UEs it can be determined, or otherwise concluded, to disable the utilization of probing pilots.

Figure 12:
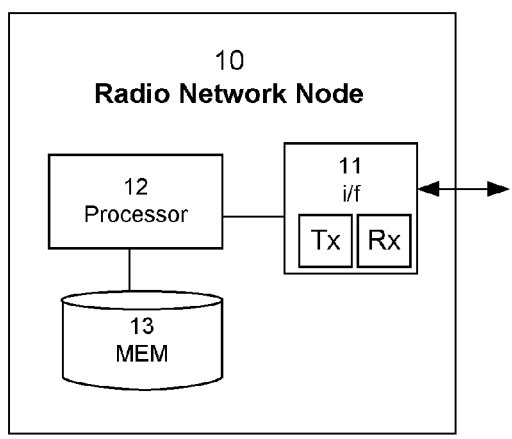
FIG. 12 shows an example implementation of a radio network node.

Turning now to FIG. 12, an example embodiment of a radio network node 10 will be described. The radio network node 10 is configured to operate in a shared radio cell deployment, as described earlier. Also, the radio network node 10 may be configured to execute the methods described in this disclosure. The radio network node may be a RNC. Alternatively, the radio network node may be a eNB. In one example implementation, the radio network node 10 comprises a communication interface 11. The communication interface 11 may comprise a transmitting module (Tx), or transmitter. The communication interface 11 may also comprise a receiving module (Rx), or receiver. Alternatively, the communication interface 11 may comprise a transceiving module (Tx/Rx), or transceiver, with both transmission and reception capabilities. The radio network node 10 also comprises a processor 12 and a memory 13. The memory 13 stores computer program code which, when run in the processor, causes the radio network node 10 to collect (e.g. obtaining, acquiring, or receiving) information on UE capabilities of UEs that are present in the shared radio cell 10c; and based on the collected information, determining whether there exists one or several UE that is/are capable of utilizing probing pilots for checking which one of several radio cell sectors is the best available radio cell sector for a UE in question. The communication interface 11 is configured to transmit the probing pilots to the UEs responsive to a determination that there exists at least one UE (i.e. one or more) that is capable of utilizing probing pilots.

Again, it should be appreciated that one example UE which would support the utilization (or, use) of probing pilots is a Release 12 (Rel-12) UE. A Rel-12 UE is a UE that is configured to operate according to the 3GPP Rel-12 Technical Specifications. It is conceivable that UEs that are configured to operate according to any future 3GPP releases (e.g. Rel-13 and/or beyond) are also of a UE type, which would support the utilization of probing pilots.

In one embodiment, the memory 13 stores computer program code, which, when run in the processor 12 causes the radio network node 10 to determine the number of UEs that are capable of utilizing probing pilots; compare the determined number of UEs with a first threshold value; determine that said probing pilots are to be utilized when the determined number of UEs is equal to or above said first threshold value; and determine that said probing pilots are not to be utilized when the determined number of UEs is below said first threshold value.

In a further embodiment, the memory 13 stores computer program code, which, when run in the processor 12 causes the radio network node 10 to determine a traffic load of the shared radio cell; compare the determined traffic load of the shared cell with a second threshold value; determine that said probing pilots are to be utilized and thus continuing to utilize said probing pilots when the determined traffic load of the shared cell is equal to or above said second threshold value; and determine that said probing pilots are not to be utilized and thus disabling the utilization of probing pilots when the determined traffic load of the shared cell is below said second threshold value.

In still another embodiment, the memory 13 stores computer program code, which, when run in the processor 12 causes the radio network node 10 to determine a location of the at least one UE that is capable of utilizing probing pilots; determine whether probing pilots are to be utilized in dependence of the determined location of said at least one UE that is capable of utilizing probing pilots. In one embodiment, the radio network node is configured to collect (e.g. obtaining, acquiring, or receiving) location information from each one of the radio units, the location information comprising information indicative of the location of each of said one or several UEs that are capable of utilizing probing pilots. The location information may comprise information about measured signal parameters such as PSRP (Probing Signal Received Power) and/or PSRQ (Probing Signal Received Power).

In still another embodiment, the memory 13 stores computer program code, which, when run in the processor 12 causes the radio network node 10 to compare a total sum of all measured signal parameters with a third threshold value; determine that said probing pilots are to be utilized and thus continuing to utilize said probing pilots when the total sum of all measured signal parameters is equal to or above said third threshold value; and determine that said probing pilots are not to be utilized and thus disabling the utilization of probing pilots when the total sum of all measured signal parameters is below said third threshold value.

Figure 13:
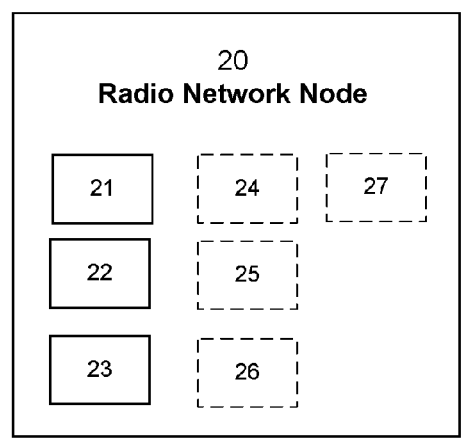
FIG. 13 shows another example implementation of a radio network node.

Turning now to FIG. 13, another example embodiment of a radio network node 20 will be described. This radio network node 20 may be a RNC. Alternatively, the radio network node 20 may be a eNB. In one example implementation, the radio network node 20 comprises an information collection module 21 for collecting information on UE capabilities of UEs that are present in the shared radio cell. Furthermore, the radio network node 20 comprises a determination module 22 for determining, based on the collected information, whether there exists at least one UE that is capable of utilizing probing pilots for checking which one of several radio cell sectors is the best available radio cell sector for the UE in question. Still further, a transmission module 23, or transmitter, is provided for transmitting probing pilots to the UEs when it has been determined that there exists at least one UE that is capable of utilizing probing pilots.

In one embodiment, the radio network node 20 may comprise a UE counter module 24 for determining the number of UEs that are capable of utilizing probing pilots. Also, the UE counter module 24 may be configured to compare the determined or otherwise counted number of UEs with a first threshold value. Furthermore, the UE counter module 24 may be configured to determine that said probing pilots are to be utilized when the determined number of UEs is equal to or above said first threshold value and that said probing pilots are not to be utilized when the determined number of UEs is below said first threshold value. Again, the first threshold value may be any of the following values: 1, 2, 3, 4, 5, 10, 20, 30, 40, 50, 100.

In one embodiment, the radio network 20 may comprise a traffic load module 25 for determining a traffic load of the shared radio cell. The traffic load module 25 may be configured to compare the determined traffic load of the shared cell with a second threshold value. Also, the traffic load module 25 may be configured to determine that said probing pilots are to be utilized and thus continue to utilize said probing pilots when the determined traffic load of the shared cell is equal to or above said second threshold value. Furthermore, the traffic load module 25 may be configured to determine that said probing pilots are not to be utilized and thus disable the utilization of probing pilots when the determined traffic load of the shared cell is below said second threshold value.

In one embodiment, the radio network node 20 may comprise a location determination module 26 for determining a location of the at least one UE that is capable of utilizing probing pilots. The location determination module 26 may be configured to determine whether probing pilots are to be utilized in dependence of the determined location of said at least one UE that is capable of utilizing probing pilots. The location determination module 26 may be configured to collect location information from each one of the radio units. To this end, the location determination module 26 may also comprise a transmission module and/or a receiving module having transmission and reception functionality, respectively. The location information may comprise information indicative of the location of each of said one or several UEs that are capable of utilizing probing pilots. For example, the location information may comprise information about measured signal parameters such as PSRP (Probing Signal Received Power) and PSRQ (Probing Signal Received Power).

In one embodiment, the radio network node may comprise a signal comparator module 27 for comparing a total sum of all measured signal parameters with a third threshold value. The signal comparator module 27 may be configured to determine that said probing pilots are to be utilized and thus continue to utilize said probing pilots when the total sum of all measured signal parameters is equal to or above said third threshold value and that said probing pilots are not to be utilized and thus disable the utilization of probing pilots when the total sum of all measured signal parameters is below said third threshold value.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

SELECTED EXAMPLE EMBODIMENTS

The technology disclosed herein thus encompasses without limitation the following non-limiting example embodiments:

Example Embodiment M1

A method (100) performed by a radio network node, the radio network node being operating in a shared radio cell deployment where several radio units are controlled by the radio network node and where each of the several radio units is serving a respective radio cell sector of a shared radio cell; the method comprising:
  collecting (110) information on UE capabilities of UEs that are present in the shared radio cell;
  based on the collected information, determining (120) whether there exists at least one UE that is capable of utilizing probing pilots for checking which one of several radio cell sectors is the best available radio cell sector for the UE in question; and
  transmitting (130) probing pilots to the UEs when it has been determined that there exists at least one UE that is capable of utilizing probing pilots.

Example Embodiment M2

The method (100) according to example embodiment M1, comprising:
  determining (121) the number of UEs that are capable of utilizing probing pilots;
  comparing (122) the determined number of UEs with a first threshold value;
  determining (130) that said probing pilots are to be utilized when the determined number of UEs is equal to or above said first threshold value; and
  determining (140) that said probing pilots are not to be utilized when the determined number of UEs is below said first threshold value.

Example Embodiment M3

The method according to example embodiment M2, wherein the first threshold value is any of the following values: 1, 2, 3, 4, 5, 10, 20, 30, 40, 50, 100.

Example Embodiment M4

The method of any of the previous example embodiments, further comprising:
  determining (123) a traffic load of the shared radio cell;
  comparing (124) the determined traffic load of the shared cell with a second threshold value;
  determining (130) that said probing pilots are to be utilized and thus continuing to utilize said probing pilots when the determined traffic load of the shared cell is equal to or above said second threshold value; and
  determining (140) that said probing pilots are not to be utilized and thus disabling the utilization of probing pilots when the determined traffic load of the shared cell is below said second threshold value.

Example Embodiment M5

The method according to any of the previous example embodiments, comprising:
  determining (125) a location of the at least one UE that is capable of utilizing probing pilots;
  determining (126) whether probing pilots are to be utilized in dependence of the determined location of said at least one UE that is capable of utilizing probing pilots.

Example Embodiment M6

The method according to example embodiment M5, wherein the determining (125) of said location of said at least one UE that is capable of utilizing probing pilots involves:
  collecting location information from each one of the radio units, the location information comprising information indicative of the location of each of said one or several UEs that are capable of utilizing probing pilots.

Example Embodiment M7

The method according to example embodiment M6, wherein the location information comprises information about measured signal parameters such as PSRP (Probing Signal Received Power) and PSRQ (Probing Signal Received Power).

Example Embodiment M8

The method according to example embodiment M7, comprising:
  comparing (126a) a total sum of all measured signal parameters with a third threshold value;
  determining (130) that said probing pilots are to be utilized and thus continuing to utilize said probing pilots when the total sum of all measured signal parameters is equal to or above said third threshold value; and determining (140) that said probing pilots are not to be utilized and thus disabling the utilization of probing pilots when the total sum of all measured signal parameters is below said third threshold value.

Example Embodiment N1

A radio network node (10), wherein the radio network node (10) is configured to operate in a shared radio cell deployment (100) where several radio units (20-1, 20-2, 20-3) are controlled by the radio network node (10) and where each of the several radio units (20-1, 20-2, 20-3) is configured to serve a respective radio cell sector (20-1c, 20-2c, 20-3c) of a shared radio cell (10c); the radio network node (10) comprising:
  a communication interface (11) for communication with the several radio units (20-1, 20-2, 20-3) and for communication with at least one UE;
  a processor (12); and
  a memory (13) storing computer program code which, when run in the processor (12), causes the radio network node (10) to collect information on UE capabilities of UEs that are present in the shared radio cell (10c); based on the collected information, determining whether there exists at least one UE that is capable of utilizing probing pilots for checking which one of several radio cell sectors (20-1c, 20-2c, 20-3c) is the best available radio cell sector for the UE in question; wherein the communications interface (11) is configured to transmit the probing pilots to the UEs responsive to a determination that there exists at least one UE that is capable of utilizing probing pilots.

Example Embodiment N2

The radio network node (10) according to example embodiment N1, wherein the memory (13) stores computer program code, which, when run in the processor (12) causes the radio network node (10) to determine the number of UEs that are capable of utilizing probing pilots; compare the determined number of UEs with a first threshold value; determine that said probing pilots are to be utilized when the determined number of UEs is equal to or above said first threshold value; and determine that said probing pilots are not to be utilized when the determined number of UEs is below said first threshold value.

Example Embodiment N3

The radio network node (10) according to example embodiment N2, wherein the first threshold value is any of the following values: 1, 2, 3, 4, 5, 10, 20, 30, 40, 50, 100.

Example Embodiment N4

The radio network node (10) of any of the example embodiments N1-N3, wherein the memory (13) stores computer program code, which, when run in the processor (12) causes the radio network node (10) to determine a traffic load of the shared radio cell; compare the determined traffic load of the shared cell with a second threshold value; determine that said probing pilots are to be utilized and thus continuing to utilize said probing pilots when the determined traffic load of the shared cell is equal to or above said second threshold value; and determine that said probing pilots are not to be utilized and thus disabling the utilization of probing pilots when the determined traffic load of the shared cell is below said second threshold value.

Example Embodiment N5

The radio network node (10) according to any of the example embodiments N1-N4, wherein the memory (13) stores computer program code, which, when run in the processor (12) causes the radio network node (10) to determine a location of the at least one UE that is capable of utilizing probing pilots; determine whether probing pilots are to be utilized in dependence of the determined location of said at least one UE that is capable of utilizing probing pilots.

Example Embodiment N6

The radio network node (10) according to example embodiment N5, wherein the radio network node (10) is configured to collect location information from each one of the radio units, the location information comprising information indicative of the location of each of said one or several UEs that are capable of utilizing probing pilots.

Example Embodiment N7

The radio network node (10) according to example embodiment N6, wherein the location information comprises information about measured signal parameters such as PSRP (Probing Signal Received Power) and PSRQ (Probing Signal Received Power).

Example Embodiment N8

The radio network node (10) according to example embodiment N7, wherein the memory (13) stores computer program code, which, when run in the processor (12) causes the radio network node (10) to compare a total sum of all measured signal parameters with a third threshold value; determine that said probing pilots are to be utilized and thus continuing to utilize said probing pilots when the total sum of all measured signal parameters is equal to or above said third threshold value; and determine that said probing pilots are not to be utilized and thus disabling the utilization of probing pilots when the total sum of all measured signal parameters is below said third threshold value.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation.

The invention claimed is:
1. A method performed by a radio network node, the radio network node operating in a shared radio cell deployment where several radio units are controlled by the radio network node and where each of the several radio units is serving a respective radio cell sector of a shared radio cell, the method comprising:
  collecting information on User Equipment (UE) capabilities of UEs that are present in the shared radio cell;
  based on the collected information, determining whether there exists at least one UE that is capable of utilizing probing pilots for checking which one of several radio cell sectors is a best available radio cell sector for the at least one UE;

transmitting the probing pilots to the at least one UE when it has been determined that the at least one UE that is capable of utilizing the probing pilots exists;

determining a traffic load of the shared radio cell;

comparing the determined traffic load of the shared radio cell with a second threshold value;

determining that the probing pilots are to be utilized and thus continuing to utilize the probing pilots in response to the determined traffic load of the shared radio cell being equal to or above the second threshold value; and determining that the probing pilots are not to be utilized and thus disabling the utilization of the probing pilots in response to the determined traffic load of the shared radio cell being below the second threshold value.

2. The method of claim 1, further comprising:

determining a number of UEs that are capable of utilizing the probing pilots;

comparing the determined number of UEs with a first threshold value;

determining that the probing pilots are to be utilized in response to the determined number of UEs being equal to or above the first threshold value; and determining that the probing pilots are not to be utilized in response to the determined number of UEs being below the first threshold value.

3. The method of claim 2, wherein the first threshold value is any one of the following values: 1, 2, 3, 4, 5, 10, 20, 30, 40, 50, and 100.

4. The method of claim 1, further comprising:

determining a location of the at least one UE that is capable of utilizing the probing pilots; and determining whether the probing pilots are to be utilized based on the determined location of the at least one UE that is capable of utilizing the probing pilots.

5. The method of claim 4, wherein the determining of the location of the at least one UE that is capable of utilizing the probing pilots comprises collecting location information from each one of the radio units, the location information comprising information indicative of the location of at least one UE that is capable of utilizing the probing pilots.

6. The method of claim 5, wherein the location information comprises information about measured signal parameters.

7. The method of claim 6, further comprising:

comparing a total sum of all measured signal parameters with a third threshold value;

determining that the probing pilots are to be utilized and thus continuing to utilize the probing pilots in response to the total sum of all measured signal parameters being equal to or above the third threshold value; and determining that the probing pilots are not to be utilized and thus disabling the utilization of the probing pilots in response to the total sum of all measured signal parameters being below the third threshold value.

8. The method of claim 1, wherein the at least one UE that is capable of utilizing the probing pilots for checking which one of the several radio cell sectors is the best available radio cell sector for the at least one UE is a Release 12 UE.

9. A radio network node, wherein the radio network node is configured to operate in a shared radio cell deployment where several radio units are controlled by the radio network node and where each of the several radio units is configured to serve a respective radio cell sector of a shared radio cell, the radio network node comprising:

a communication interface for communication with the several radio units and for communication with at least one User Equipment (UE);

a processing circuit; and memory storing computer program code which, when run by the processing circuit, causes the radio network node to:

collect information on UE capabilities of UEs that are present in the shared radio cell;

based on the collected information, determine whether there exists at least one UE that is capable of utilizing probing pilots for checking which one of several radio cell sectors is a best available radio cell sector for the at least one UE;

determine a traffic load of the shared radio cell;

compare the determined traffic load of the shared radio cell with a second threshold value;

determine that the probing pilots are to be utilized and thus continue to utilize the probing pilots in response to the determined traffic load of the shared radio cell being equal to or above the second threshold value; and determine that the probing pilots are not to be utilized and thus disable the utilization of probing pilots in response to the determined traffic load of the shared radio cell being below the second threshold value;

wherein the communications interface is configured to transmit the probing pilots to the at least one UE responsive to a determination that the at least one UE that is capable of utilizing the probing pilots exists.

10. The radio network node of claim 9, wherein the computer program code, when run by the processing circuit, causes the radio network node to:

determine the number of UEs that are capable of utilizing the probing pilots;

compare the determined number of UEs with a first threshold value;

determine that the probing pilots are to be utilized in response to the determined number of UEs being equal to or above the first threshold value; and determine that the probing pilots are not to be utilized in response to the determined number of UEs being below the first threshold value.

11. The radio network node of claim 10, wherein the first threshold value is any one of the following values: 1, 2, 3, 4, 5, 10, 20, 30, 40, 50, and 100.

12. The radio network node of claim 9, wherein the computer program code, when run by the processing circuit, causes the radio network node to:

determine a location of the at least one UE that is capable of utilizing probing pilots; and determine whether the probing pilots are to be utilized based on the determined location of the at least one UE that is capable of utilizing probing pilots.

13. The radio network node of claim 12, wherein the radio network node is configured to collect location information from each one of the radio units, the location information comprising information indicative of the location of at least one UE that is capable of utilizing the probing pilots.

14. The radio network node of claim 13, wherein the location information comprises information about measured signal parameters.

15. The radio network node of claim 14, wherein the computer program code, when run by the processing circuit, causes the radio network node to:

compare a total sum of all measured signal parameters with a third threshold value;

determine that the probing pilots are to be utilized and thus continue to utilize the probing pilots in response to the total sum of all measured signal parameters being equal to or above the third threshold value; and determine that the probing pilots are not to be utilized and thus disable the utilization of the probing pilots in response to the total sum of all measured signal parameters being below the third threshold value.

16. The radio network node of claim 9, wherein the at least one UE that is capable of utilizing the probing pilots for checking which one of several radio cell sectors is the best available radio cell sector for the at least one UE is a Release 12 UE.

17. The radio network node of claim 9, wherein the radio network node is a Radio Network Controller (RNC).

18. The radio network node of claim 9, wherein the radio network node is an evolved NodeB (eNB).

\* \* \* \* \*